(12) United States Patent
Rutherford (10) Patent No.: US 6,843,115 B2
(45) Date of Patent: Jan. 18, 2005

(54) AIR PRESSURE GAUGE ASSEMBLY FOR CONTINUOUS MONITORING OF TIRE INFLATION PRESSURE

(76) Inventor: Robert Rutherford, 8200 Offenhauser Dr., #118-A, Reno, NV (US) 89511

( * ) Notice: Subject to any disclaimer, the term of this patent is extended or adjusted under 35 U.S.C. 154(b) by 33 days.

(21) Appl. No.: 10/163,330

(22) Filed: Jun. 5, 2002

(65) Prior Publication Data

US 2003/0226400 A1 Dec. 11, 2003

(51) Int. Cl.[7] .............................................. B60C 23/02
(52) U.S. Cl. ........................ 73/146.8; 73/146.3; 73/700
(58) Field of Search ............................... 73/146–146.8, 73/700

(56) References Cited

U.S. PATENT DOCUMENTS

| | | | |
|---|---|---|---|
| 3,789,867 A | * 2/1974 | Yabor | 137/227 |
| 3,873,965 A | 3/1975 | Garcia | |
| 3,969,936 A | 7/1976 | Lindsay | |
| 4,051,803 A | * 10/1977 | Arnone | 116/34 R |
| 4,248,080 A | 2/1981 | Chuck | |
| 4,606,391 A | 8/1986 | Achterholt | |
| 4,619,137 A | * 10/1986 | Bott | 73/146.5 |
| 4,763,516 A | * 8/1988 | Greenspan | 73/146.8 |
| 4,924,697 A | 5/1990 | Hunt et al. | |
| 4,953,395 A | * 9/1990 | Jard | 73/146.8 |
| 4,970,491 A | * 11/1990 | Saint et al. | 340/447 |
| 5,040,562 A | 8/1991 | Achterholt | |
| 5,365,967 A | * 11/1994 | Moore | 137/226 |
| 5,377,539 A | 1/1995 | LaSalle | |
| 5,503,012 A | 4/1996 | Rabizadeh | |

OTHER PUBLICATIONS

Spiragage Plus product description.

* cited by examiner

Primary Examiner—Edward Lefkowitz
Assistant Examiner—Alandra Ellington
(74) Attorney, Agent, or Firm—Heisler & Associates (57) ABSTRACT

An air pressure gauge assembly is mounted to the valve stem of a tire or integrated into a wheel rim for continuous monitoring of the tire inflation pressure. The gauge assembly includes a check valve functionally coupled to the valve stem so that the check valve provides the common function of the valve stem, including allowing for inflation and deflation. The assembly also includes a pressure sensor coupled to a visually perceptible pressure indicator on a dial face.

28 Claims, 7 Drawing Sheets

AIR PRESSURE GAUGE ASSEMBLY FOR CONTINUOUS MONITORING OF TIRE INFLATION PRESSURE

BACKGROUND OF THE INVENTION

1. Field of the Invention

This invention relates generally to air pressure gauges for pneumatic tires and, more specifically, to an air pressure gauge assembly mounted to the valve stem of a tire for continuous monitoring of the tire inflation without interfering with the common function of a valve stem; and an air pressure gauge assembly permanently mounted to the rim of a wheel for continuous monitoring of the tire inflation.

2. Description of the Prior Art

Proper tire inflation is important for fuel economy of a vehicle and prolongs the life of a tire. By maintaining proper tire inflation, optimum performance of a vehicle can be reached while keeping the operating costs relatively low and the safety relatively high. Under inflation of a tire can cause excessive wear of the tire, tire failure, loss of fuel economy, excessive engine drag, increased emissions, and depletion of fossil fuels.

In general, the air pressure of a tire is checked by removing a cap from a valve stem, applying a pressure gauge to the valve stem to get a pressure reading, and replacing the cap onto the valve stem. In order to simplify this process several replacement valve caps have been developed, which indicate when the tire pressure falls below normal, for example U.S. Pat. No. 5,365,967 issued to Moore, U.S. Pat. No. 4,606,391 issued to Achterholt, and U.S. Pat. No. 5,040,562 issued to Achterholt. A lower then normal tire pressure is indicated by color codes or other indicator means. These devices only indicate a low tire pressure without displaying the real pressure of the tire. To inflate the tire, the valve cap still needs to be removed and the correct tire pressure needs to be determined after inflation with a traditional pencil gauge or other type of external gauge before the valve cap can be replaced.

Prior art also includes air pressure gauges mounted directly to a tire valve stem, for example U.S. Pat. No. 4,924,697 issued to Hunt et al., U.S. Pat. No. 5,377,539 issued to LaSalle, and U.S. Pat. No. 5,503,012 issued to Rabizadeh. Other air pressure gauges are directly substitutable for a conventional valve stem, for example U.S. Pat. No. 3,969,936 issued to Lindsay, but require the tire to be deflated for installation thereof. The prior art further includes air pressure gauges mounted to a gauge-securing threaded aperture typically provided in the wheel of a pneumatic tire for an aircraft, for example U.S. Pat. No. 4,248,080 issued to Chuck. All of these devices monitor and indicate the tire inflation pressure continuously. While some devices need to be removed for inflating the tires, others do not interfere with the tire inflation through the valve stem and also monitor the air pressure while inflating the tire. Still most of these air pressure gauges are connected to the tire valve stem and are driven by the air coming through the valve stem. This can cause a problem when replacing the tire and/or the valve stem. Also, if a prior art pressure gauge is accidentally broken off or fractured, air may leak causing hazardous deflation of the tire. Depending on the tire positions, prior art air pressure gauges may be hard to read. Devices that extend the valve stem may influence the balance of the wheel.

Therefore a need existed to provide an air pressure gauge assembly mounted to a valve stem that has the capability of inflating and deflating the tire through the gauge itself, that not only continuously displays the tire pressure but is easy to read, that also may be able to indicate a warning for lower than normal air pressure, and therefore eliminates the use of an external handheld air pressure gauge.

A further need existed to provide an air pressure gauge assembly mounted to a valve stem that is relatively compact, light weight, and extends the valve stem relatively little to avoid curb contact and interference with the wheel balance.

A still further need existed to provide an air pressure gauge assembly mounted permanently to the wheel rim of a vehicle that does not interfere with the tire valve stem, that continuously displays the tire pressure in an easy to read way, and that may also be capable of indicating a warning for lower than normal air pressure.

A still further need existed to provide an air pressure gauge assembly that is able to withstand substantial impact and to seal the tire if the housing thereof is accidentally broken off or fractured.

A still further need existed to provide an air pressure gauge assembly that does not cause a problem when exchanging tires and/or the valve stem.

A still further need existed to provide an air pressure gauge that is sturdy enough to withstand the centrifugal forces of the rotating tire.

A still further need existed to provide an air pressure gauge that is relatively inexpensive, reliable, and of little or no maintenance.

SUMMARY OF THE INVENTION

An object of the present invention is to provide an air pressure gauge assembly for continuous monitoring of the inflation pressure of a tire that can be mounted to a valve stem and has the capability of inflating and deflating the tire through the gauge itself, that continuously displays the tire pressure in an easy to read way, and may be able to indicate a warning for lower than normal air pressure.

It is a further object of the present invention to provide an air pressure gauge assembly mounted to a valve stem that is relatively compact and extends the valve stem relatively little to avoid curb contact and interference with the wheel balance.

It is a further object of the present invention to provide an air pressure gauge assembly for continuous monitoring of the inflation pressure of a tire that can be permanently mounted to the rim of a wheel and does not interfere with the valve stem of the tire, that continuously displays the tire pressure in an easy to read way, may be able to indicate a warning for lower than normal air pressure, and is relatively compact and light weight.

It is a still further object of the present invention to provide an air pressure gauge assembly that is able to seal the tire if the gauge body is accidentally broken off or fractured.

It is a still further object of the present invention to provide an air pressure gauge assembly that is sturdy enough to withstand the centrifugal forces of the rotating tire.

It is a still further object of the present invention to provide an air pressure gauge assembly that is relatively inexpensive, reliable, and of little or no maintenance.

BRIEF DESCRIPTION OF THE PREFERRED EMBODIMENTS

In accordance with one embodiment of the present invention, a valve stem mountable, flow-through air pressure gauge assembly for continuous monitoring of tire inflation pressure is disclosed comprising, in combination: a gauge body of compact design, a sensing element, means for mounting the gauge body to an existing valve stem, a pressure indicator, a dial face including a display light, a power source, a lens cover, and an air exhaust check valve.

In accordance with another embodiment of the present invention, an air pressure gauge assembly mountable through the wheel rim of an inflatable tire for continuous monitoring of tire inflation pressure is disclosed, comprising, in combination: a gauge body of compact design, a sensing element, means for mounting the gauge body in an airtight connection through a aperture in the wheel rim of an inflatable tire, means for allowing air to flow from the tire into the sensing element and sealing the wheel rim airtight in case the gauge body is accidentally broken off above the wheel rim or fractured, a pressure indicator, a dial face including a display light, a power source, and a lens cover.

In accordance with still another embodiment of the present invention, an air pressure gauge assembly is disclosed, wherein the sensing element is a Bourdon tube, a c-tube, a helix-coil, or a diaphragm.

In accordance with still another embodiment of the present invention, an air pressure gauge assembly is disclosed, wherein the pressure indicator is in a geared or non-geared connection with the sensing element.

In accordance with still another embodiment of the present invention, an air pressure gauge assembly is disclosed, wherein the dial face is analog or digital and includes a warning light that is a steady light or a flashing light.

In accordance with still another embodiment of the present invention, an air pressure gauge assembly is disclosed, wherein the display light is a LCD/LED or an INDIGLO nightlight.

In accordance with still another embodiment of the present invention, an air pressure gauge assembly is disclosed, wherein the power source is an internal or an external power source.

In accordance with still another embodiment of the present invention, an air pressure gauge assembly is disclosed, wherein the lens cover is a viewing non-magnifying lens or a magnifying lens.

In accordance with still another embodiment of the present invention, an air pressure gauge assembly is disclosed, wherein the gauge is liquid filled or non-liquid filled.

The foregoing and other objects, features, and advantages of the invention will be apparent from the following, more particular, description of the preferred embodiments of the invention, as illustrated in the accompanying drawings.

BRIEF DESCRIPTION OF THE DRAWINGS

FIG. 5b is a top view of an analog dial face of the air pressure gauge assembly of FIG. 5a.

DETAILED DESCRIPTION OF THE PREFERRED EMBODIMENTS

Figure 1:
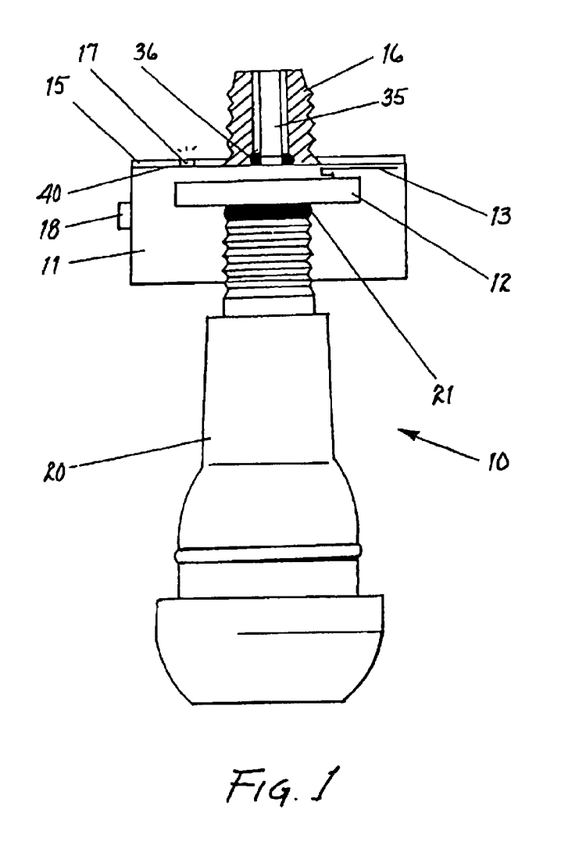
FIG. 1 is a side view of a valve stem mountable, flow-through air pressure gauge assembly according to the present invention.

Referring to FIG. 1 a side view of a valve stem mountable, flow-through air pressure gauge assembly 10 according to the present invention is shown. The air pressure gauge assembly 10 generally comprises a gauge body 11, a sensing element 12, a pointer 13 that is a pressure indicator, a dial face 40, a lens cover 15, and an air exhaust check valve 16. The air pressure gauge assembly 10 can be mounted, preferably screwed and locked, onto a typical valve stem 20 of an inflatable tire. The connection is sealed with a washer, preferably an o-ring 21. A warning light 17 can be installed under the lens cover 15, powered by an external power source 18 mounted to the outside of the gauge body 11.

Figure 2:
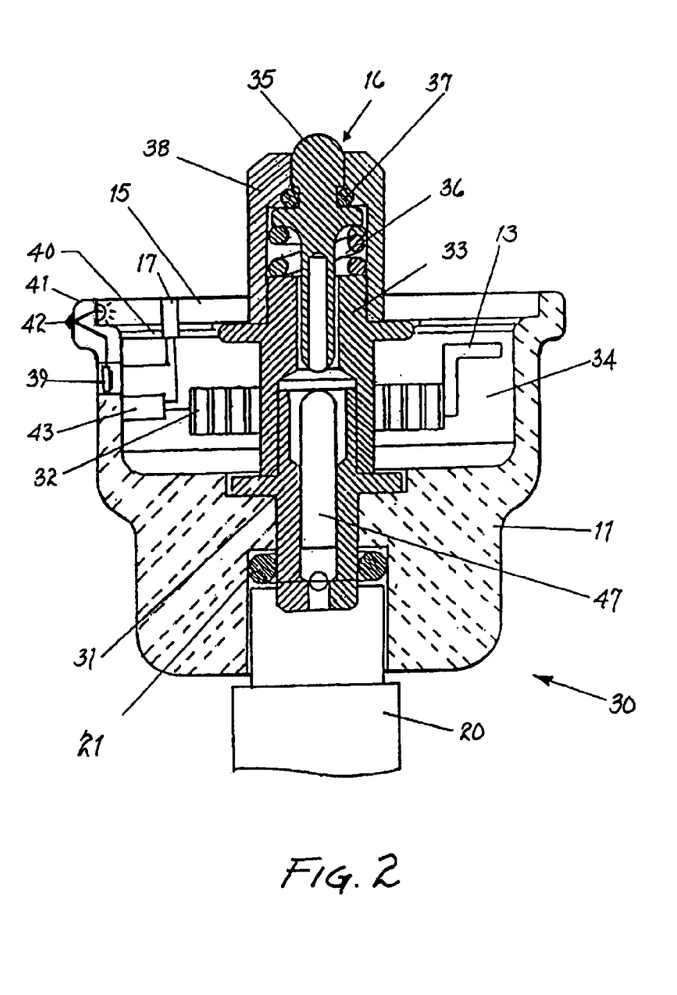
FIG. 2 is a cross sectional view of a first preferred embodiment of the valve stem mountable, flow-through air pressure gauge assembly.
Figure 5A:
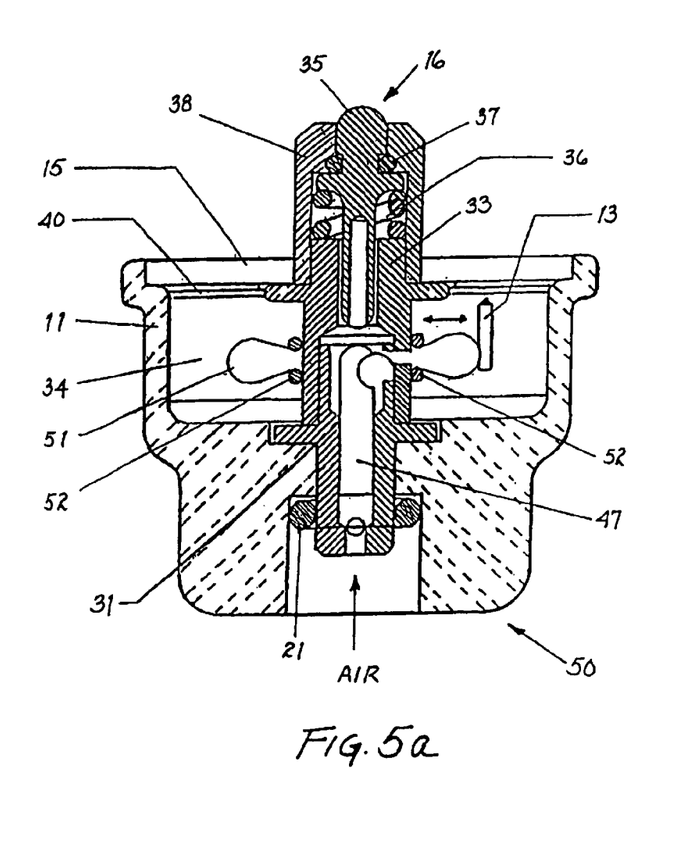
FIG. 5a is a cross sectional view of a third preferred embodiment of the valve stem mountable, flow-through air pressure gauge assembly.

Turning now to FIG. 2, a cross sectional view of a first preferred embodiment 30 of the valve stem mountable, flow-through air pressure gauge assembly 10 is shown. In the first preferred embodiment 30 of the air pressure gauge assembly 10 the sensing element 12 (shown in FIG. 1) comprises a Bourdon tube 32. The Bourdon tube 32 is configured as a spiral coil disposed concentrically around a sensing coil manifold 33 that is mounted to a part of a sensing element housing 31. The Bourdon tube 32 is disposed in an airtight chamber 34 that can be non-liquid or liquid filled. The inner end of the Bourdon tube 32 is fixed in a sealed connection around an orifice, hidden from view, in the wall of the sensing element housing 31. By mounting the gauge body 11 to the valve stem 20, the lower end of the sensing element housing 31 depresses the valve core, hidden from view, inside the valve stem 20 and therefore, allows air to flow from inside the tire into an inner chamber 47 of the sensing element housing 31 and into the hollow interior core of the Bourdon tube 32. The washer 21, preferably an o-ring, provides an airtight connection of the gauge body 11 and the valve stem 20. Should the gauge body 11 accidentally be broken off or fractured, the depressed valve core, hidden from view, inside the valve stem 20 will be released to seal the valve stem 20 and to maintain the air pressure inside the tire. The Bourdon tube 32 will coil more tightly or uncoil more loosely in response to the air pressure condition within the core of the tube. The Bourdon tube 32 can coil either clockwise or counter-clockwise. In one preferred embodiment, the distal end portion of the Bourdon tube 32 is sealed tight with an end extremity being fashioned into the configuration of a pointer 13 (non-geared). In another preferred embodiment, the distal end portion of the Bourdon tube 32 is sealed tight and connected to a gear that moves the pointer 13. The sensing element 12 can also be a helix coil (as shown in FIG. 3), a diaphragm (as shown in FIG. 5a), a c-tube, similar to "Power Flex™ Movement" manufactured by ASHCROFT®, or an electronic simm chip.

Still referring to FIG. 2, the air exhaust check valve 16 comprises a plunger 35, an air exhaust compressing spring 36, a check valve o-ring 37, and an air intake manifold cover 38. The air intake cover 38 is threaded on the outside to accept a standard valve stem cap. The air exhaust check valve 16 allows tire inflation or deflation through the gauge assembly 30 itself.

Figure 3:
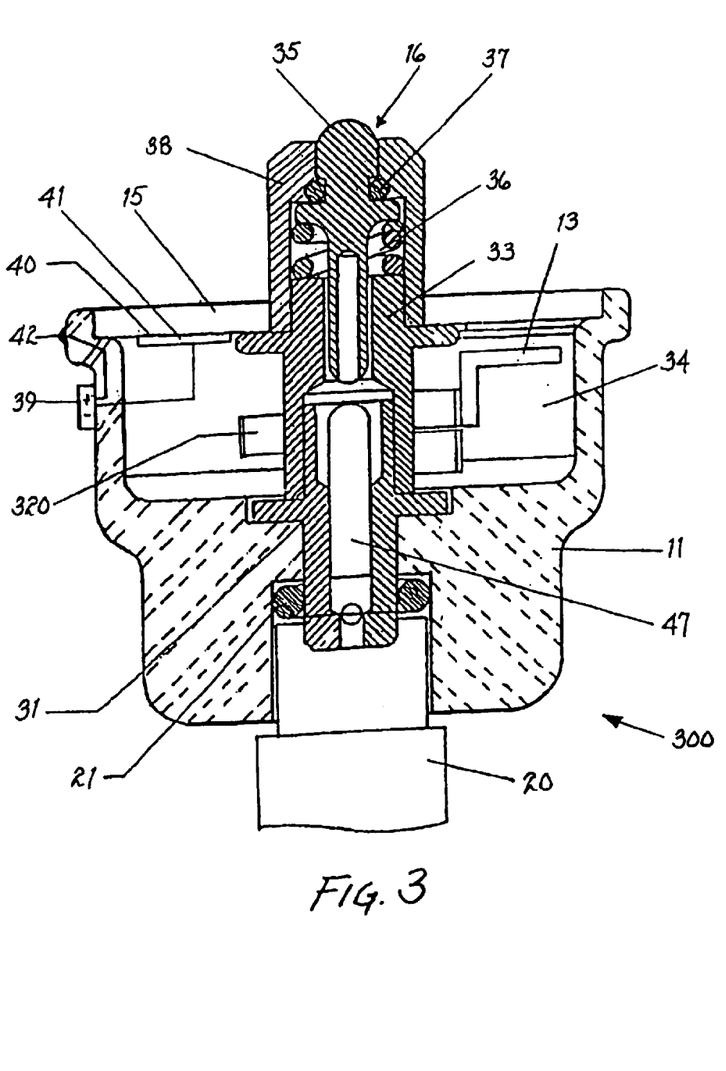
FIG. 3 is a cross sectional view of a second preferred embodiment of the valve stem mountable, flow-through air pressure gauge assembly.

Referring now to FIG. 3, a cross sectional view of a second preferred embodiment 300 of the valve stem mountable, flow-through air pressure gauge assembly 10 is shown. In the second preferred embodiment 300 of the air pressure gauge assembly 10 the sensing element 12 (shown in FIG. 1) comprises a helix-coil 320. The helix-coil 320 is a spiral/helical wound Bourdon tube. The helix-coil 320 is able to resist shock and vibration to a higher extent then other variations of a Bourdon tube. Using the helix coil 320 expensive liquid filled gauges can be avoided.

In all other aspects is the air pressure gauge assembly 300, shown in FIG. 3, identical to the air pressure gauge assembly 30, shown in FIG. 2.

Figure 4A:
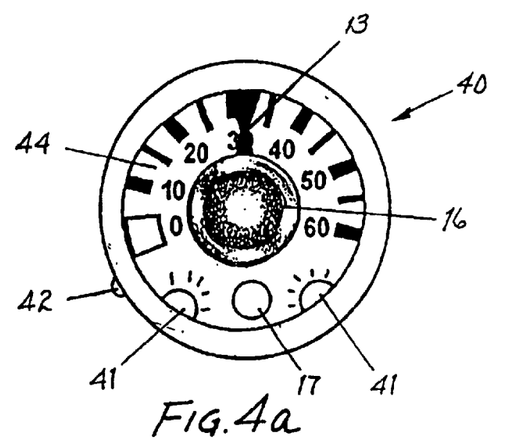
FIG. 4a is a top view of an analog dial face of the air pressure gauge assembly of FIGS. 2 and 3.
Figure 4B:
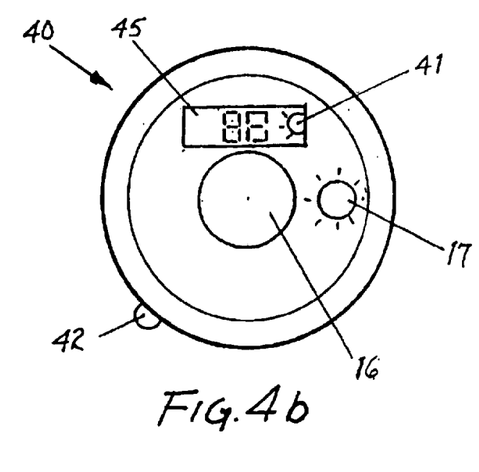
FIG. 4b is a top view of a digital dial face of the air pressure gauge assembly of FIGS. 2 and 3.
Figure 4C:
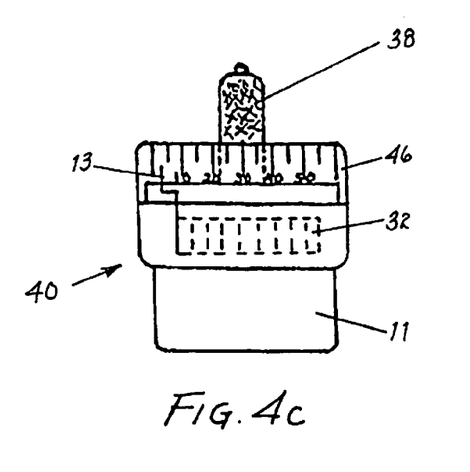
FIG. 4c is a side view of the analog dial face covered with a magnifying lens of the air pressure gauge assembly of FIGS. 2 and 3.

Referring now to FIGS. 4a to 4c, possible variations of the dial face 40 of the air pressure gauge assembly 30 and 300, of FIGS. 2 and 3, will be discussed.

In one preferred embodiment, a warning light 17 is installed beneath the dial face 40. The warning light 17 is powered by an external power source 18 (shown in FIGS. 1 and 3) or an internal power source 39 (shown in FIG. 2), preferably a cadmium battery. The warning light 17 indicates a lower than normal air pressure and can be adjusted to be turned on if tire air pressure decreases by a certain amount, for instance 2 psi or 4 psi. The warning light 17 can get a signal from a sensor or a pressure switch 43, where an electrical circuit is opened or closed in response to a predetermined hydraulic pressure entering the switch from a connected source, preferably the Bourdon tube 32. The warning light 17, preferably a LCD/LED, can be steady or flashing. In another preferred embodiment, a display light 41, also powered by the external power source 18 or the internal power source 39, is integrated into the display to enhance the readability of the dial face 40. The display light 41 is also connected to an on/off switch 42, in order to be turned on only if needed. There can be one or more display lights installed as necessary. In one preferred embodiment, the display light 41 is an INDIGLO nightlight installed beneath the dial face 40, as shown in FIG. 3. In another preferred embodiment, the display light 41 is a LCD/LED. In still another preferred embodiment, the dial face 40 is luminescent.

In one preferred embodiment, the dial face 40 is an analog display 44 having indicia and a dial scale thereon for indicating the air pressure detected by the sensing element 12, as shown in FIG. 4a. In another preferred embodiment, the dial face 40 is a digital display 45, preferably a LCD/LED display, as shown in FIG. 4b. The dial face 40 is covered with a lens cover 15. In one preferred embodiment, the lens cover 15 is a non-magnifying lens glued on top of the gauge body 11, as shown in FIGS. 1 and 2. In another preferred embodiment, the lens cover 15 comprises a magnifying lens 46, as shown in FIG. 4c. The gauge body 11 and the magnifying lens 46 are preferably manufactured through injection mould. The pointer 13 is bent upwards to allow viewing from the side as well as from top.

Figure 5B:
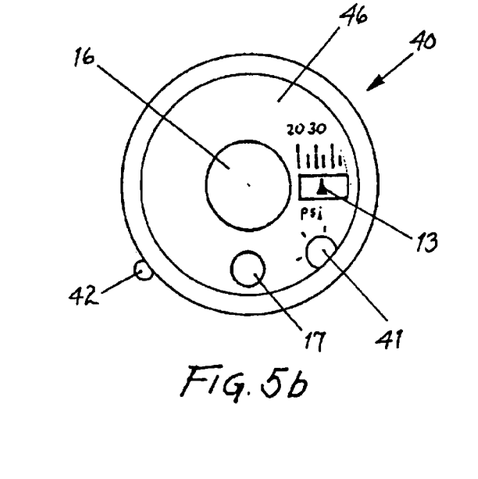

Turning now to FIG. 5a, a cross sectional view of a third preferred embodiment 50 of the valve stem mountable, flow-through air pressure gauge assembly 10 is shown. In the second air pressure gauge assembly 50 the sensing element 12 (shown in FIG. 1) comprises a diaphragm 51, preferably having a doughnut-shape. The diaphragm 51 has a sealed connection, through seals 52, to the inner chamber 47 of the sensing element housing 31. By mounting the gauge body 11 to the valve stem 20, the lower end of the sensing element housing 31 depresses the valve core, hidden from view, inside the valve stem 20 and therefore, allows air to flow from inside the tire into an inner chamber 47 of the sensing element housing 31 and into the hollow interior of the diaphragm 51. The diaphragm 51 will expand or contract in longitudinal direction in response to the air pressure condition within. In one preferred embodiment, the distal end portion of diaphragm 51 is connected with a pointer 13 (non-geared). FIG. 5b shows an analog dial face 46 for the air pressure gauge assembly 50. Furthermore, the air pressure gauge assembly 50 exhibits all other characteristics and variations shown for the air pressure gauge assembly 30, as shown in FIG. 2.

Figure 6A:
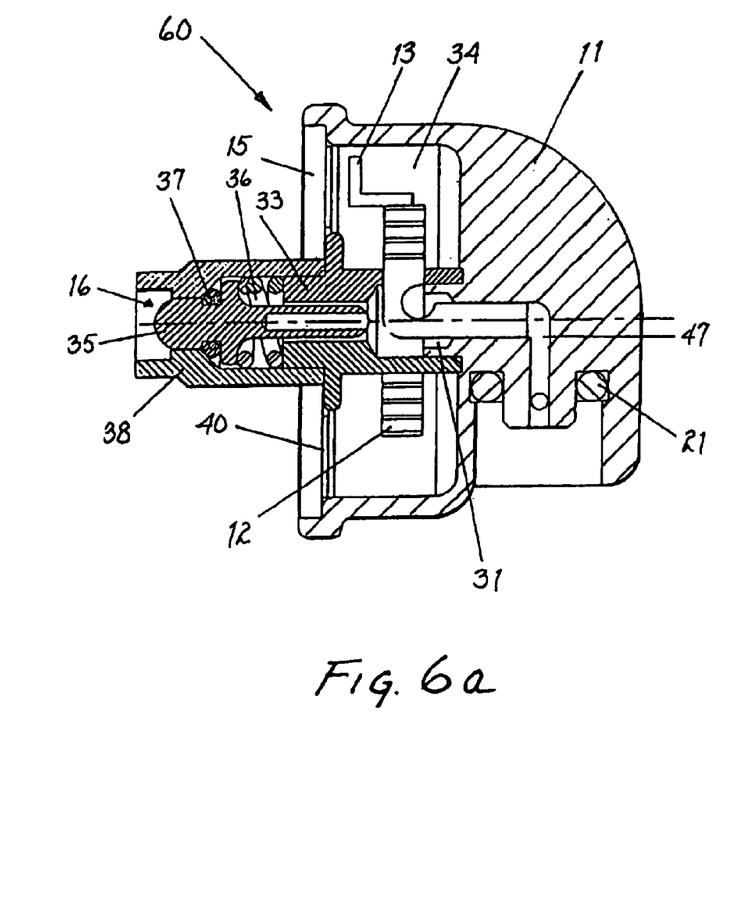
FIG. 6a is a cross sectional view of a fourth preferred embodiment of the valve stem mountable, flow-through air pressure gauge assembly.

Referring now to FIG. 6a, a cross sectional view of a fourth preferred embodiment 60 of the valve stem mountable, flow-through air pressure gauge assembly 10 is shown. The gauge body 11 of the valve stem mountable, flow-through air pressure gauge assembly 60 has a right angle (90°) from air intake base 16 to valve stem 20.

Figure 6B:
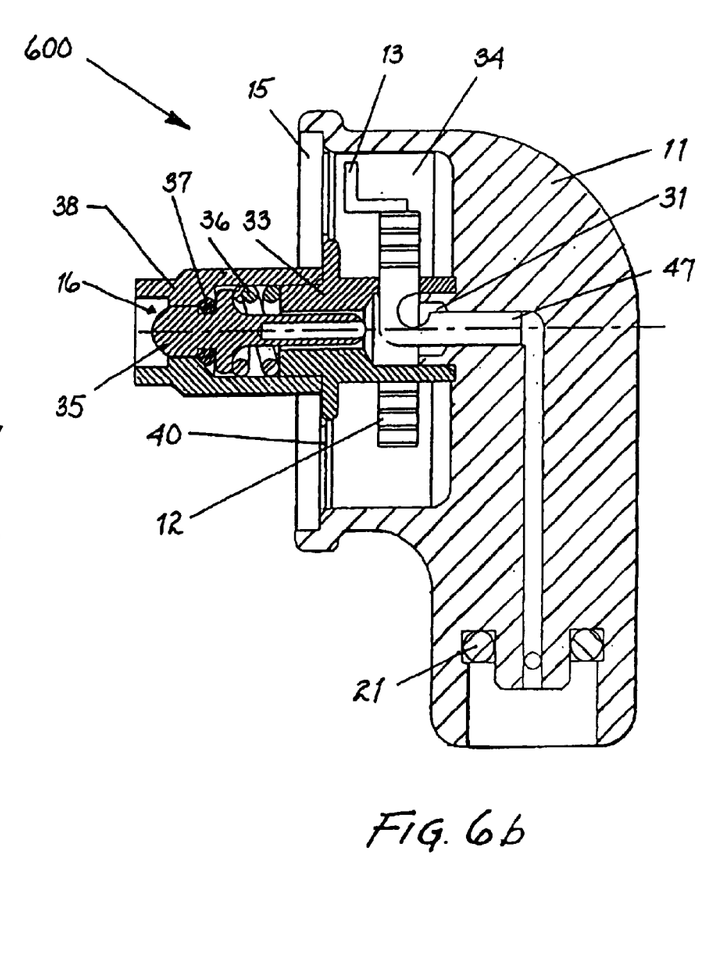
FIG. 6b is a cross sectional view of a fifth preferred embodiment of the valve stem mountable, flow-through air pressure gauge assembly.

The gauge body 11 of the valve stem mountable, flow-through air pressure gauge assembly 600 (as shown in FIG. 6b) has an extended right angle (90°) from air intake base 16 to valve stem 20. The right-angled gauge body 11 of the valve stem mountable, flow-through air pressure gauge assembly 60 and 600 can be used in connection with all other preferred embodiments of the valve stem mountable, flow-through air pressure gauge assembly 10 as shown in FIGS. 1 to 5.

Figure 7:
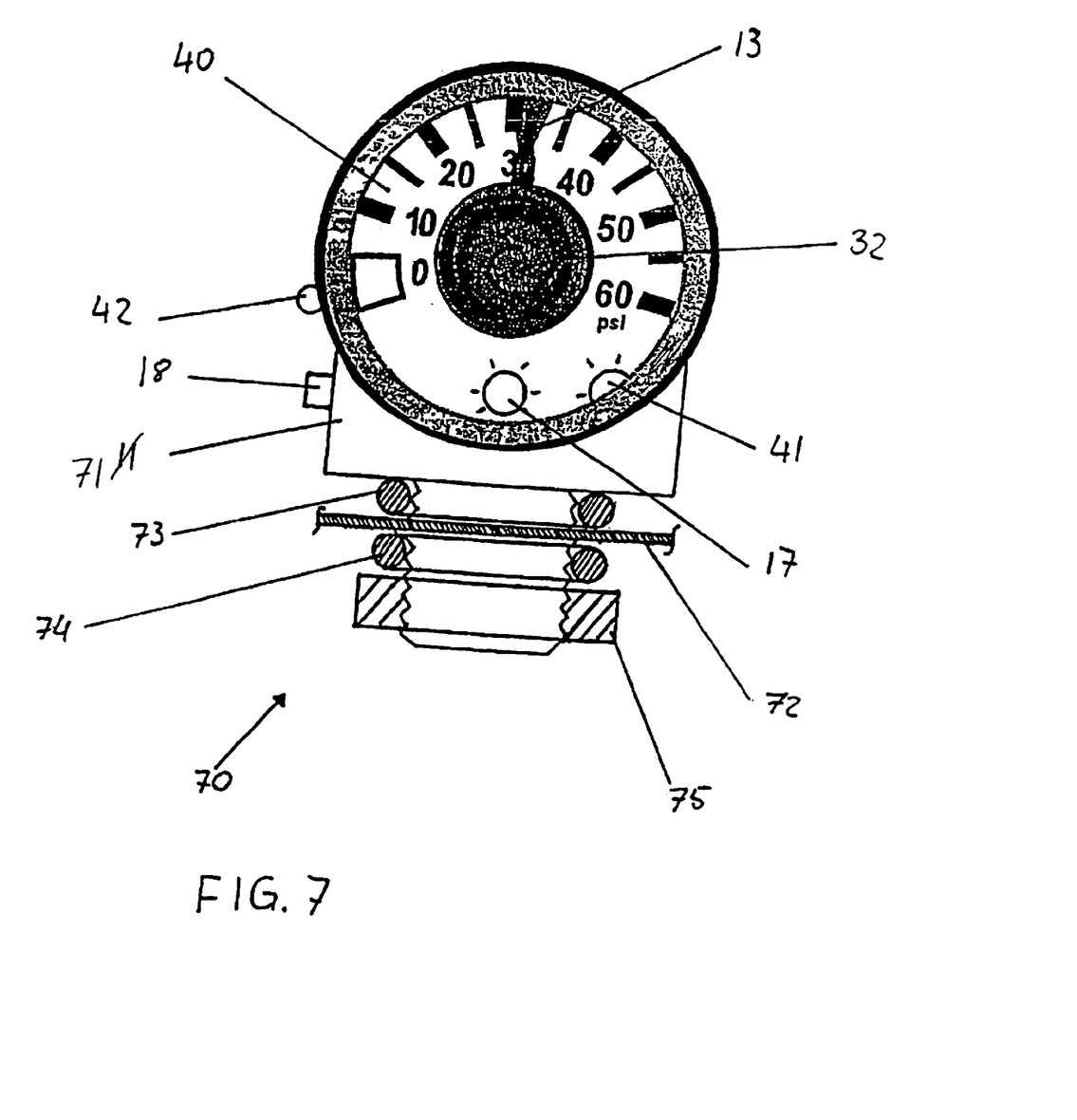
FIG. 7 is a side view of an air pressure gauge assembly mountable through the wheel rim of an inflatable tire according to the present invention.

Referring now to FIG. 7, a side view of an air pressure gauge assembly 70 mountable through the wheel rim 72 of an inflatable tire according to the present invention is shown. The air pressure gauge assembly 70 mountable through the wheel rim 72 of an inflatable tire comprises a gauge body 71, a dial face 40, and a pointer 13. The gauge body 71 is mounted in an airtight connection through a aperture in the wheel rim 72, similar as a typical valve stem, using an outer rim air seal 73, an inner rim air seal 74, and a rim-fastening nut 75. The gauge body 71 can also be mounted using a threaded fitting through the wheel rim 72 into a gauge-securing threaded aperture. The outer rim air seal 73 and the inner rim air seal 74 are washers, preferably o-rings. In one preferred embodiment, a warning light 17 and/or a display light 41 is installed with the dial face 40, powered by an external power source 18 and connected with an on/off switch 42. The dial face 40 is shown as an analog dial face bent in a right angle for improved readability of the dial face 40.

Figure 8:
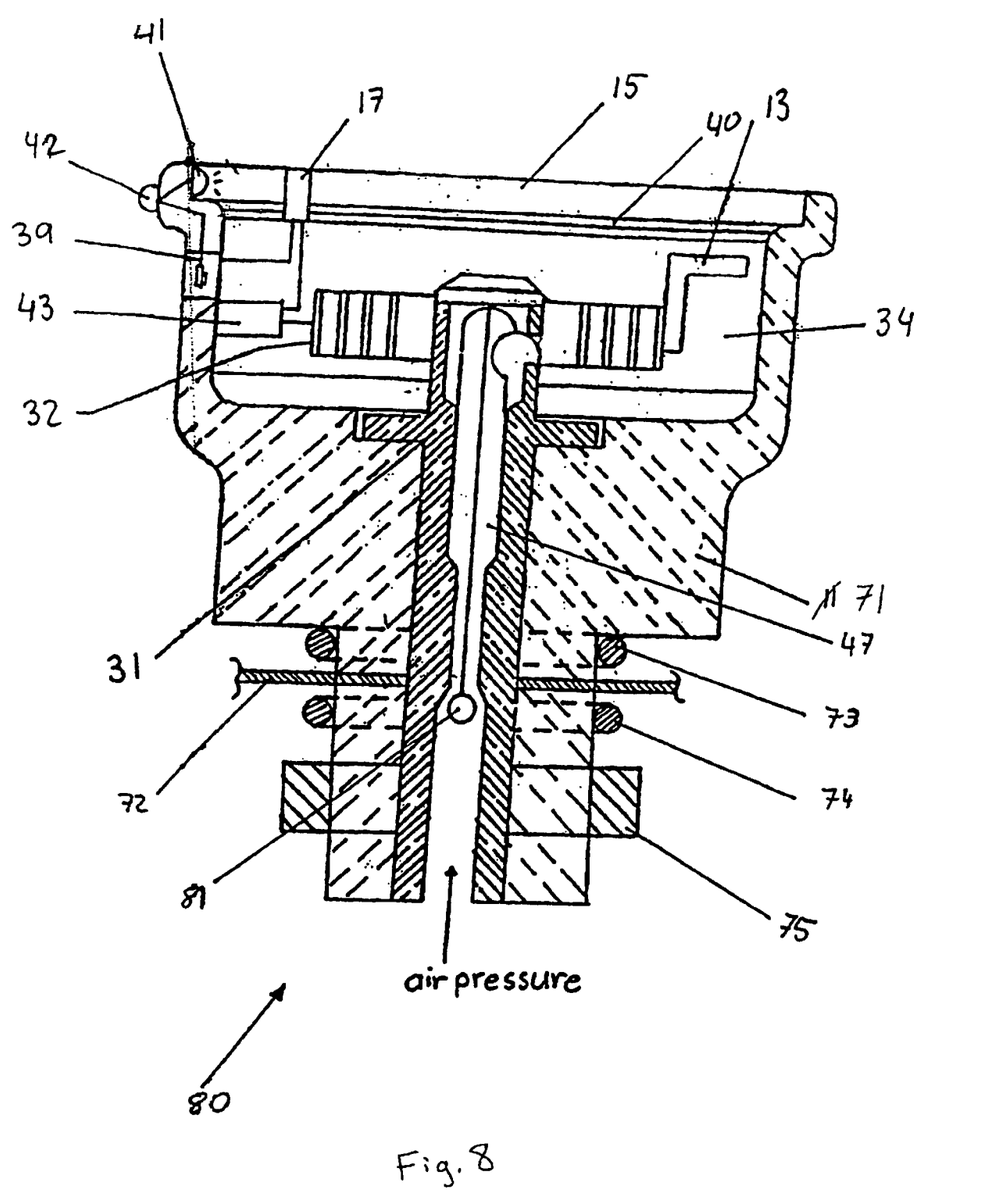
FIG. 8 is a cross sectional view of a first preferred embodiment of the air pressure gauge assembly mountable through the wheel rim of an inflatable tire.

Turning now to FIG. 8, a cross sectional view of a first preferred embodiment 80 of the air pressure gauge assembly 70, mountable through the wheel rim 72 of an inflatable tire, is shown. The first preferred embodiment 80 of the air pressure gauge assembly 70 comprises a Bourdon tube 32 as sensing element 12 as described in conjunction with FIG. 2.

Inside the sensing element housing 31, a ball check valve 81 is mounted so that air from the tire can flow into an inner chamber 47 of the sensing element housing 31 and into the hollow interior core of the Bourdon tube 32. Should the gauge body 71 accidentally be broken off above the wheel rim 72 or fractured, the ball check valve 81 will seal the tire and maintain the air pressure inside.

Figure 9:
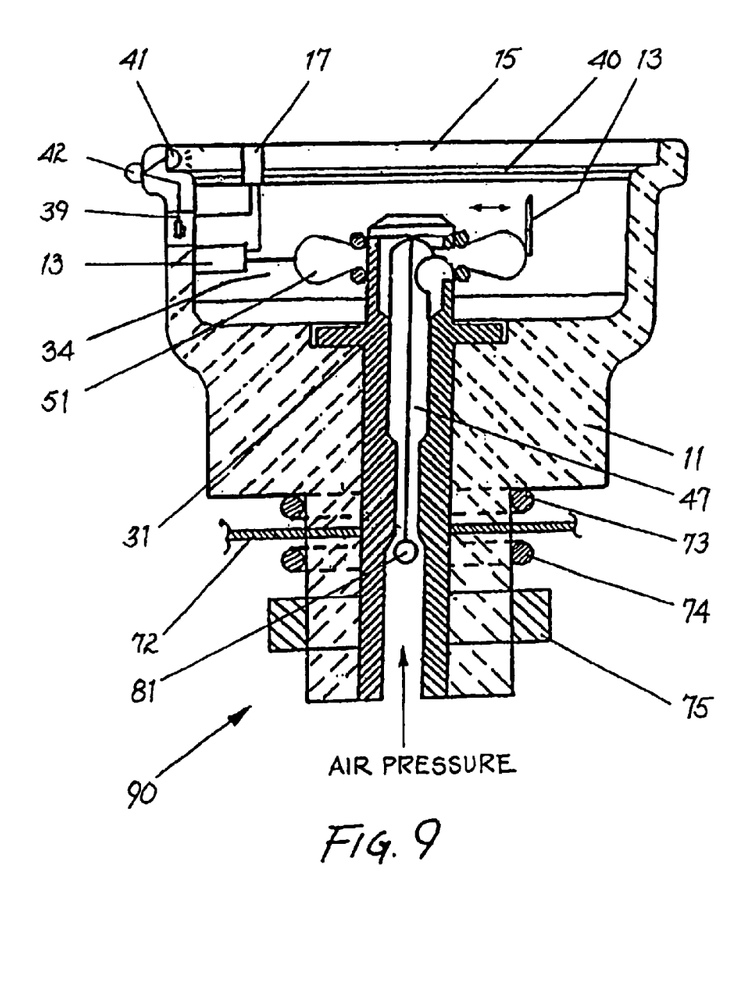
FIG. 9 is a cross sectional view of a second preferred embodiment of the air pressure gauge assembly mountable through the wheel rim of an inflatable tire.
Figure 10:
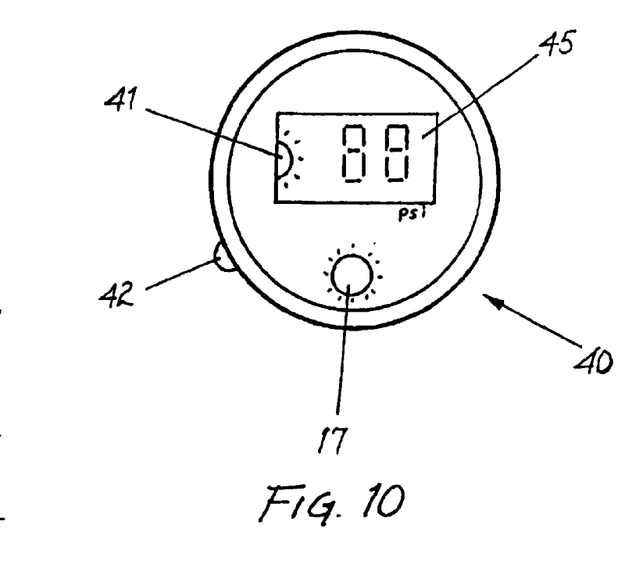
FIG. 10 is a top view of a digital dial face of the air pressure gauge assembly of FIG. 8 and FIG. 9.

Referring now to FIG. 9, a cross sectional view of a second preferred embodiment 90 of the air pressure gauge assembly 70, mountable through the wheel rim 72 of an inflatable tire, is shown. The second preferred embodiment 90 of the air pressure gauge assembly 70 comprises a diaphragm 51 as sensing element as described in conjunction with FIG. 5. In a third preferred embodiment, the sensing element 12 used in the air pressure gauge assembly 70 is a helix-coil 320, as shown in FIG. 3. FIGS. 8 and 9 show the dial face 40 not angled as one preferred embodiment of the present invention. In another preferred embodiment, the dial face 40 comprises a digital display 41 as shown in FIG. 10.

The air pressure gauge assembly 70, mountable through the wheel rim 72 of an inflatable tire, also comprises all variations and preferred embodiments of the valve stem mountable, flow-through air pressure gauge assembly 10, as shown in FIGS. 1–6.

The gauge bodies 11 and 71 have a compact design, but are not limited to any particular shape, material, or color.

By introducing the air pressure gauge assembly 70, mountable through the wheel rim 72 of an inflatable tire, the continuous monitoring of the air pressure of inflated tires is made possible without interfering with the operation of the tire valve stem and replacement of the tire. The valve stem mountable, flow-through air pressure gauge assembly 10, offers the convenience of being mounted to an existing tire valve stem and still allowing inflating or deflating of the tire there through while continuously displaying the air pressure.

Both types of air pressure gauge assemblies 10 and 70 provide the tire to be sealed in case the gauge body 11 or 71 is accidentally broken off or fractured. Furthermore, both types of air pressure gauge assemblies 10 and 70 provide several variations of easy to read dial faces 40 and 73, including a warning light for lower than normal air pressure and a display light. Also, both types of air pressure gauge assemblies 10 and 70 are of compact design and relatively inexpensive, reliable, and of little or no maintenance.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A valve stem mountable, flow-through air pressure gauge assembly for continuous monitoring of tire inflation pressure comprising, in combination:
   a gauge body of compact design;
   a sensing element being disposed in an airtight chamber inside said gauge body;
   means for mounting said gauge body to an existing valve stem of an inflatable tire with an airtight connection including means for depressing the valve core of said valve stem to allow air from a tire to flow into said sensing element;
   a dial face;
   a pressure indicator being connected to said sensing element;
   a display light having an on/off switch;
   a power source;
   a lens cover; and
   an air exhaust check valve including a plunger, an air exhaust compressing spring, a check-valve o-ring, and an air intake manifold cover for inflating and deflating said tire through said gauge body;
   wherein said dial face further comprises a warning light; and
   wherein said warning light is connected to said sensing element using a sensor to indicate an adjustable, certain air pressure decrease.

2. A valve stem mountable, flow-through air pressure gauge assembly for continuous monitoring of tire inflation pressure comprising, in combination:
   a gauge body of compact design;
   a sensing element being disposed in an airtight chamber inside said gauge body;
   means for mounting said gauge body to an existing valve stem of an inflatable tire with an airtight connection including means for depressing the valve core of said valve stem to allow air from a tire to flow into said sensing element;
   a dial face;
   a pressure indicator being connected to said sensing element;
   a display light having an on/off switch;
   a power source;
   a lens cover;
   an air exhaust check valve including a plunger, an air exhaust compressing spring, a check-valve o-ring, and an air intake manifold cover for inflating and deflating said tire through said gauge body;
   wherein said dial face further comprises a warning light; and
   wherein said warning light is a steady light.

3. A valve stem mountable, flow-through air pressure gauge assembly for continuous monitoring of tire inflation pressure comprising, in combination;
   a gauge body of compact design;
   a sensing element being disposed in an airtight chamber inside said gauge body;
   means for mounting said gauge body to an existing valve stem of an inflatable tire with an airtight connection including means for depressing the valve core of said valve stem to allow air from a tire to flow into said sensing element;
   a dial face;
   a pressure indicator being connected to said sensing element;
   a display light having an on/off switch;
   a power source;
   a lens cover;
   an air exhaust check valve including a plunger, an air exhaust compressing spring, a check-valve o-ring, and an air intake manifold cover for inflating and deflating said tire through said gauge body;
   wherein said dial face further comprises a warning light; and
   wherein said warning light is a flashing light.

4. A valve stem mountable, flow-through air pressure gauge assembly for continuous monitoring of tire inflation pressure comprising, in combination;
   a gauge body of compact design;
   a sensing element being disposed in an airtight chamber inside said gauge body;
   means for mounting said gauge body to an existing valve stem of an inflatable tire with an airtight connection including means for depressing the valve core of said valve stem to allow air from a tire to flow into said sensing element;

a dial face;

a pressure indicator being connected to said sensing element;

a display light having an on/off switch;

a power source;

a lens cover;

an air exhaust check valve including a plunger, an air exhaust compressing spring, a check-valve o-ring, and an air intake manifold cover for inflating and deflating said tire through said gauge body;

wherein said dial face further comprises a warning light; and wherein said warning light comprises a LCD/LED.

5. A valve stem mountable, flow-through air pressure gauge assembly for continuous monitoring of tire inflation pressure comprising, in combination;

a gauge body of compact design;

a sensing element being disposed in an airtight chamber inside said gauge body;

means for mounting said gauge body to an existing valve stem of an inflatable tire with an airtight connection including means for depressing the valve core of said valve stem to allow air from a tire to flow into said sensing element;

a dial face;

a pressure indicator being connected to said sensing element;

a display light having an on/off switch;

a power source;

an air exhaust check valve including a plunger, an air exhaust compressing spring, a check-valve o-ring, and an air intake manifold cover for inflating and deflating said tire through said gauge body; and wherein said display light comprises an INDIGLO nightlight.

6. A valve stem mountable, flow-through air pressure gauge assembly for continuous monitoring of tire inflation pressure comprising, in combination;

a gauge body of compact design;

a sensing element being disposed in an airtight chamber inside said gauge body;

means for mounting said gauge body to an existing valve stem of an inflatable tire with an airtight connection including means for depressing the valve core of said valve stem to allow air from a tire to flow into said sensing element;

a dial face;

a pressure indicator being connected to said sensing element;

a display light having an on/off switch;

a power source;

a lens cover;

an air exhaust check valve including a plunger, an air exhaust compressing spring, a check-valve o-ring, and an air intake manifold cover for inflating and deflating said tire through said gauge body; and wherein said power source is integrated into said gauge body allowing access from the outside thereof.

7. An air pressure gauge assembly mountable through the wheel rim of an inflatable tire for continuous monitoring of tire inflation pressure comprising, in combination;

a gauge body of compact design;

a sensing element being disposed in an airtight chamber inside said gauge body;

means for mounting said gauge body in an airtight connection through a aperture in the wheel rim of an inflatable tire including an outer rim seal, an inner rim seal, and means for fastening;

means for allowing air to flow from said tire into said sensing element;

means for sealing said aperture in said wheel rim airtight in case said gauge body is accidentally broken off above said wheel rim or fractured;

a pressure indicator being connected to said sensing element;

a dial face;

a display light having an on/off switch;

a power source providing power for said display light; and a lens cover.

8. The air pressure gauge assembly of claim 7, wherein said dial face further comprises a warning light.

9. The air pressure gauge assembly of claim 7, wherein said sensing element comprises a Bourdon tube.

10. The air pressure gauge assembly of claim 7, wherein said sensing element comprises a helix-coil.

11. The air pressure gauge assembly of claim 7, wherein said sensing element comprises a diaphragm.

12. The air pressure gage assembly of claim 7, wherein said airtight chamber is non-liquid filled.

13. The air pressure gauge assembly of claim 7, wherein said airtight chamber is liquid filled.

14. The air pressure gauge assembly of claim 7, wherein said pressure indicator comprises a pointer directly connected to said sensing element.

15. The air pressure gauge assembly of claim 7, wherein said dial face comprises an analog display having indicia and dial scale thereon for indicating the air pressure detected by said sensing element.

16. The air pressure gauge assembly of claim 7, wherein said dial face comprises a digital display.

17. The air pressure gauge assembly of claim 8, wherein said warning light is connected to said sensing element using a sensor indicate an adjustable certain air pressure decrease.

18. The air pressure gauge assembly of claim 8, wherein said warning light is connected to said sensing element using a pressure switch to indicate an adjustable certain air pressure decrease.

19. The air pressure gauge assembly of claim 8, wherein said warning light is a steady light.

20. The air pressure gauge assembly of claim 8, wherein said warning light is a flashing light.

21. The air pressure gauge assembly of claim 8, wherein said waning light comprises a LCD/LED.

22. The air pressure gauge assembly of claim 7, wherein said display light comprises an INDIGLO nightlight.

23. The air pressure gauge assembly of claim 7, wherein said display light comprises a LCD/LED.

24. The air pressure gauge assembly of claim 7, wherein said power source is integrated into said gauge body allowing access from the outside thereof.

25. The air pressure gauge assembly of claim 7, wherein said power source located outside of said gauge body.

26. The air pressure gauge assembly of claim 7, wherein said lens cover comprises non-magnifying lens.

27. The air pressure gauge assembly of claim 7, wherein said lens cover comprises a magnifying lens.

28. The air pressure gauge assembly of claim 7, wherein said pressure indicator is a pointer bent upwards to be visible from the side was well as from the top.

* * * * *